US010527105B2

(12) United States Patent
Lück et al.

(10) Patent No.: US 10,527,105 B2
(45) Date of Patent: Jan. 7, 2020

(54) LONGITUDINAL SHAFT ARRANGEMENT FOR A MOTOR VEHICLE

(71) Applicant: GKN Driveline Deutschland GmbH, Offenbach am Main (DE)

(72) Inventors: Dietmar Lück, Rodgau (DE); Herbert Cermak, Bessenbach (DE)

(73) Assignee: GKN Driveline Deutschland GmbH, Offenbach am Main (DE)

( * ) Notice: Subject to any disclaimer, the term of this patent is extended or adjusted under 35 U.S.C. 154(b) by 179 days.

(21) Appl. No.: 15/519,180

(22) PCT Filed: Oct. 6, 2015

(86) PCT No.: PCT/EP2015/073009
§ 371 (c)(1),
(2) Date: Apr. 14, 2017

(87) PCT Pub. No.: WO2016/062537
PCT Pub. Date: Apr. 28, 2016

(65) Prior Publication Data
US 2017/0241483 A1    Aug. 24, 2017

(30) Foreign Application Priority Data
Oct. 20, 2014 (DE) .................. 10 2014 115 269

(51) Int. Cl.
*F16D 3/227* (2006.01)
*F16D 3/223* (2011.01)

(52) U.S. Cl.
CPC .... *F16D 3/227* (2013.01); *F16D 2003/22303* (2013.01); *Y10S 464/906* (2013.01); *Y10T 403/15* (2015.01)

(58) Field of Classification Search
CPC ......... B62D 1/192; F16D 3/223; F16D 3/226; F16D 3/227; F16D 2003/22303; F16D 2003/2232; Y10S 464/906; Y10T 403/15
(Continued)

(56) References Cited

U.S. PATENT DOCUMENTS 5,582,546 A * 12/1996 Welschof .................. F16D 3/22
464/906
6,585,601 B2 * 7/2003 Booker .................... F16D 3/227
464/146
(Continued)

FOREIGN PATENT DOCUMENTS

CN   101712278 A    5/2010
DE   38 20 449 A1   12/1989
(Continued)

OTHER PUBLICATIONS

International Search Report and Written Opinion for PCT/EP2015/073009 dated Feb. 4, 2016 (with English translation;11 pages).

*Primary Examiner* — Josh Skroupa
(74) *Attorney, Agent, or Firm* — Bejin Bieneman PLC

(57) ABSTRACT

A longitudinal shaft arrangement for a motor vehicle has at least a first shaft and a second shaft, wherein the first shaft has a journal with a first end and a second end, and a constant velocity ball plunging joint for connecting the first shaft to the second shaft, wherein a joint inner part of the constant velocity ball plunging joint is mounted at the second end and a joint outer part is arranged on the second shaft, wherein the joint outer part has a first stop for a cage of the constant velocity ball plunging joint in an end zone of a plunging region, with the result that the cage is brought into contact with the first stop when the first shaft and the second shaft are pushed into one another.

13 Claims, 3 Drawing Sheets

Figure 1:
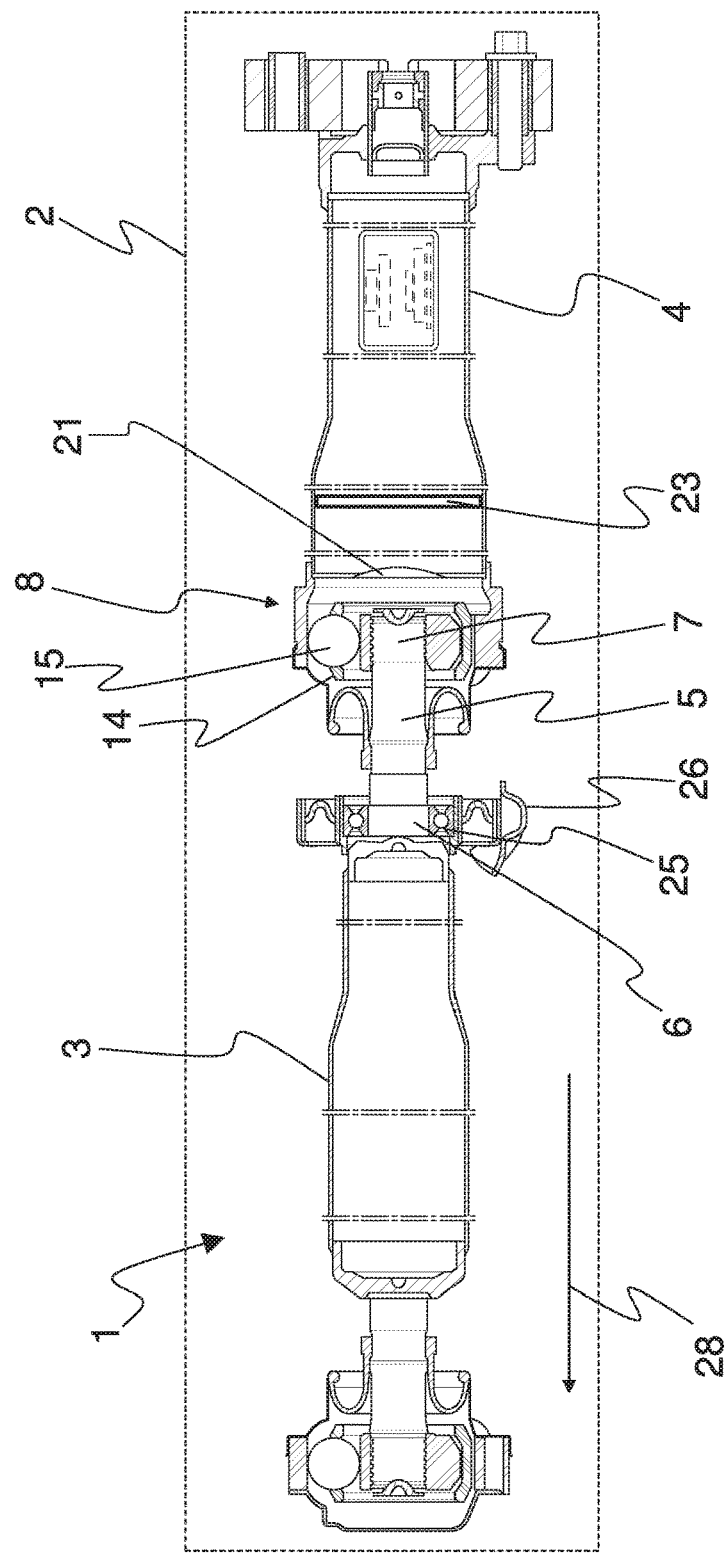

(58) Field of Classification Search
USPC .......................... 464/146, 182, 906; 403/10
See application file for complete search history.

(56) References Cited

U.S. PATENT DOCUMENTS

| | | | | |
|---|---|---|---|---|
| 6,666,771 | B2 * | 12/2003 | Boutin | F16D 3/226 |
| | | | | 464/146 |
| 6,981,919 | B2 * | 1/2006 | Sugiyama | F16D 3/227 |
| | | | | 464/146 |
| 7,040,991 | B2 * | 5/2006 | Kuczera | F16D 3/227 |
| | | | | 464/906 |
| 7,278,894 | B2 * | 10/2007 | Lyon | F16D 3/227 |
| | | | | 464/146 |
| 8,197,349 | B2 * | 6/2012 | Terada | F16D 3/227 |
| | | | | 464/906 |
| 8,206,228 | B2 * | 6/2012 | Langer | F16D 3/223 |
| | | | | 464/906 |
| 9,028,332 | B2 * | 5/2015 | Ketchel | F16D 3/227 |
| | | | | 464/906 |
| 2003/0008716 | A1 | 1/2003 | Boutin | |
| 2007/0105461 | A1 | 5/2007 | Lyon et al. | |

FOREIGN PATENT DOCUMENTS

| | | |
|---|---|---|
| DE | 4224201 A1 | 1/1994 |
| DE | 10 2008 048 388 A1 | 3/2010 |
| DE | 20 2013 003 111 U1 | 4/2013 |
| JP | H06144041 A | 5/1994 |

\* cited by examiner

LONGITUDINAL SHAFT ARRANGEMENT FOR A MOTOR VEHICLE

CROSS-REFERENCE TO RELATED APPLICATIONS

This application is a national stage of, and claims priority to, Patent Cooperation Treaty Application No. PCT/EP2015/073009, filed on Oct. 6, 2015, which claims priority to German Application No. DE 10 2014 115 269.7 filed on Oct. 20, 2014, each of which applications are hereby incorporated herein by reference in their entireties.

Disclosed herein is a longitudinal shaft arrangement, i.e., system, for a motor vehicle, wherein provision is made for at least a first shaft and a second shaft which are interconnected via a ball-type constant velocity joint in order to connect a drive end of the motor vehicle to an output end of the motor vehicle. The longitudinal shaft arrangement is usually used for transmitting torque from the drive (e.g. engine and/or transmission) to the output (e.g. differential, axle drive, transmission) of the motor vehicle, wherein the longitudinal shaft arrangement extends in the direction of the vehicle. With the drive installed in the front section of the vehicle, the longitudinal shaft arrangement transmits torque to the rear wheels, or with the drive arranged in the rear section, transmits driving force to the front wheels.

Longitudinal shaft arrangements in the motor vehicle constitute a rigid construction which is to be designed especially with regard to its crash behavior. An essential focal point in the design of longitudinal shaft arrangements is therefore that no component of the longitudinal shaft arrangement breaks away from the longitudinal shaft arrangement in such a way that it would penetrate other areas of the vehicle. Therefore, the effect of parts of the longitudinal shaft arrangement penetrating into the passenger compartment and/or into the fuel tank, as a result of which an additional risk of injury to passengers or risk of fire due to escaping fuel could occur, is to be avoided. Furthermore, it is to be ensured that the longitudinal shaft arrangement, during a deformation in the event of a crash, absorbs deformation energy continuously, (only) to the intended degree.

Such longitudinal shaft arrangements have at least a first shaft and a second shaft via which the torque of the drive of the motor vehicle is transmitted. The shafts are interconnected in this case via a ball-type constant velocity joint which preferably has a limited displacement (plunging) range in an axial direction. The movements of individual components of the longitudinal shaft arrangement or of the motor vehicle in the longitudinal direction of the vehicle (the axial direction) which occur during normal operation are compensated by means of the displacement range of the ball-type constant velocity joint. Moreover, by means of the ball-type constant velocity joint arrangement of the shafts in relation to each other under an angle which occur during operation are also compensated by articulation of the ball-type constant velocity joint. The displacement range and the articulation range of the longitudinal shaft arrangement are designed and limited specifically to application. Especially in the field of automobiles, a displacement range of the longitudinal shaft arrangement of (altogether) 30 mm to 65 mm (millimeters) can for example be assumed. In the same application case, an articulation range of 0° to 4°, even to 8° (angular degrees), can be assumed. If the displacement distance of a joint in the longitudinal shaft arrangement is taken into account, then in this case there is for example a joint displacement (plunging) range of 10 mm to 20 mm (millimeters) for the same application case.

For supporting the longitudinal shaft arrangement on the motor vehicle, provision is usually made on the longitudinal shaft arrangement for a center bearing which is arranged on at least one of the shafts. This center bearing, which is necessary for the guiding of the longitudinal shaft arrangement, additionally serves for damping and reducing the occurring vibrations of the longitudinal shaft arrangement.

Longitudinal shaft arrangements of the aforesaid type are to be designed for the respective application case, especially with regard to the drive force which is to be transmitted. Further parameters are inter alia: overall length of the longitudinal shaft arrangement, space requirement in the motor vehicle, weight of the motor vehicle, crash requirements.

A longitudinal shaft arrangement is known from DE 10 2008 048 388 A1, in which in the event of a crash the first shaft is pushed into the tubular and correspondingly hollow second shaft. In the process, the balls of the ball-type constant velocity joint leave their position between joint inner part and joint outer part and (during further displacement of the shafts) travel along the journal of the first shaft until they butt against the center bearing. The balls are now carried along by the center bearing and serve for the defined deformation of the wall of the second shaft. While the first shaft is being pushed into the second shaft, the joint inner part and the cage, and during the further course of the crash also the balls, are guided into the tubular second shaft. To this end, the inside diameter of the second shaft has to be of a correspondingly large size, however, so that a defined deformation is enabled.

Disclosed herein is a longitudinal shaft arrangement which, in the event of a crash, e.g., simulated as a result of vehicle crash trials or component crash trials of the longitudinal shaft arrangement, enables a continuous absorption of deformation energy and which is also of a space-saving construction and light in weight. Furthermore, in the event of a crash a displacement of individual components of the longitudinal shaft arrangement is to be prevented and/or a secure intercepting of possibly ensuing fragments of the components of the longitudinal shaft arrangement is also to be achieved.

The longitudinal shaft arrangement for a motor vehicle comprises at least a first shaft and a second shaft, wherein the first shaft has a journal with a first end and a second end, and also comprises a ball-type constant velocity plunging joint for connecting the first shaft to the second shaft, wherein a joint inner part of the ball-type constant velocity plunging joint is mounted on the second end and a joint outer part is arranged on the second shaft. In this case, the joint outer part, in an end zone of a displacement range, has a first stop for a cage of the ball-type constant velocity plunging joint so that the cage is brought to butt against the first stop during the telescoping of the first shaft and second shaft, wherein with a further telescoping of the first shaft and second shaft the cage and the balls of the ball-type constant velocity plunging joint are restrained and the joint inner part, which is mounted on the second end, is moved together with the first shaft into the second shaft.

The longitudinal shaft arrangement comprises a first shaft which is constructed at least in part as a hollow shaft in order to have, with a lightweight type of construction, a flexural rigidity which is as large as possible, and at the same time to be able to transmit high torque, and which, via a center bearing, e.g., in the form of a rolling bearing, is connected to the body so that the longitudinal shaft arrangement is supported via the first shaft and the center bearing on the body of the motor vehicle.

The rolling bearing has an inner race and an outer race with rolling bodies arranged in between, wherein the inner race is arranged on the circumference of the first shaft. The outer race of the rolling bearing is connected to the body of the motor vehicle.

The rolling bearing is supported at least by its inner race against a stop on the first shaft. On the side of the rolling bearing opposite this stop, the first shaft continues e.g., in the form of a journal, the end of which accommodates the inner part of the ball-type constant velocity plunging joint. The ball-type constant velocity plunging joint is arranged by its joint outer part on a second shaft which at least in certain sections continues further as a hollow shaft in the axial direction, starting from a joint bottom of the ball-type constant velocity plunging joint.

In the event of a crash, e.g., in the course of a crash trial of the motor vehicle or of only individual components, such as in the case of a head-on crash (EURO-NCAP, US-NCAP, IIHS, FMVSS 208), as a result of which the longitudinal shaft arrangement is shortened in the axial direction, the first shaft together with the journal and the joint inner part of the ball-type constant velocity joint sinks into the second (hollow) shaft. The displacement (plunging) distance of the joint is in this case first of all fully exploited so that all the components remain undamaged and functional until the cage in the end zone of the displacement distance of the ball-type constant velocity plunging joint butts against a first stop. With further displacement of the shafts (on account of a very high axial force action), the cage is expanded and/or (finally even) burst open at least in the radial direction, wherein cage and balls are restrained by the first stop. The cage is normally seated in a joint, fastened via a spherical calotte, in an axially frictionally locking manner on the associated ball hub. The first shaft, together with the journal and the joint inner part fixed thereon, can then be pushed further through the joint bottom into the second shaft.

In the end zone of the displacement range of the ball-type constant velocity plunging joint, provision is e.g., made for an encompassing free space in the joint outer part radially outside the cage. In particular, the cage, when it butts against the first stop and the joint inner part is further displaced in relation to the cage, can be (elastically) expanded, wherein the cage is forced into the radial free space. As a result of this expansion, the joint inner part can be detached from the cage and be displaced further along the axial direction in relation to the cage and joint outer part. In particular, the cage is fixed and guided in the displacement range in the radial direction right up to this end zone by means of the joint outer part (by means of the bridges between the ball tracks). The free space, into which the cage can divert as a result of the expansion by means of the joint inner part, is provided only in the end zone and right up to the first stop. In this region, the guiding of the cage in the radial direction is therefore abandoned.

The expansion and/or bursting open of the cage can be carried out under a predetermined force action so that in particular damage to other components of the longitudinal shaft arrangement is prevented.

The crash behavior of the longitudinal shaft arrangement is therefore preferably established as a priority as a result of an axial force, during which the detachment or separation of joint inner part and joint outer part of the ball-type constant velocity plunging joint occurs, wherein in particular the cage is deformed and/or damaged to the extent that the balls can no longer be retained in the respective tracks of joint inner part and joint outer part. In the event of a crash, e.g., in the case of automobiles, a defined crash force can therefore be created, wherein two categories of the crash behavior in the case of such a longitudinal shaft arrangement can preferably be predetermined: (a) slightly deformable in the case of crash forces in the region of 10 kN to 40 kN [kilo-Newtons], and (b) seriously deformable in the case of crash forces in the region of 40 kN to 80 kN.

During the telescoping of the first shaft and the second shaft, the first shaft, as a result of a largest second outside diameter of the joint inner part, is guided in a tubular section with a corresponding second inside diameter of the second shaft, wherein the second section adjoins the joint outer part in the axial direction.

This example of the longitudinal shaft arrangement, compared with the previously known concepts, enables a greater displacement distance in the case of a greatest possible diameter of the immersing shaft which itself can therefore be designed for a torsionally stiffer and flexurally stiffer loading (as well as higher rotational speeds). This longitudinal shaft arrangement also enables a lower and/or better calculable release force in the event of a crash. This longitudinal shaft arrangement can be guided better in the event of a crash so that the risk of an undesirable penetration of the shafts into adjacent regions of the longitudinal shaft arrangement can be reduced.

According to an example, a largest first outside diameter of the cage is larger than a smallest first inside diameter of the first stop and a largest second outside diameter of the joint inner part is smaller than the smallest first inside diameter of the first stop. As a result, it is ensured that the first stop prevents the cage from a further displacement in relation to the joint outer part and to the second shaft, and the join inner part, however, does not interact with the first stop.

The second shaft in connection with the joint outer part/the joint bottom is of tubular construction at least in one section and has there a smallest second inside diameter which corresponds in the main to a largest second outside diameter of the joint inner part.

Provision is made (in the joint bottom) for a cover which basically closes off the section of tubular construction of the second shaft toward the ball-type constant velocity plunging joint, wherein the cover has a largest third outside diameter which corresponds in the main to the smallest second inside diameter of the section.

The cover, during a displacement of the first shaft in relation to the second shaft beyond the joint bottom, is contacted, deformed, penetrated and/or displaced together with the first shaft in relation to the second shaft by the second end of the journal and/or by the joint inner part.

The largest second outside diameter of the joint inner part and the smallest second inside diameter of the section and/or the largest third outside diameter of the cover and the smallest second inside diameter of the section form a press fit. The press fit enables a displacement of the components against each other, wherein guiding of the first shaft in relation to the second shaft is maintained by the sliding of the joint inner part and/or of the cover along the wall of the section. At the same time, present crash energy is reduced continuously and/or in steps by deformation forces of the longitudinal shaft arrangement which are variable as a result of the press fit.

The largest second outside diameter of the joint inner part corresponds to the smallest second inside diameter of the section or the largest second outside diameter is of smaller design.

A press fit can be exclusively formed only between cover and section.

At least one additional cover is provided in the section.

In particular, the cover and/or the at least one additional cover forms a press fit with the section. Different press fits can be formed between cover and section on the one hand, and between at least one additional cover and the section on the other hand.

By arranging a plurality of covers along the section, a stepwise reduction of the present crash energy is advantageously enabled because, with continuing displacement of first shaft in relation to second shaft, additional covers are displaced, deformed and/or pierced as well.

By the guiding of the first shaft, when sinking into the second shaft by means of the joint inner part and/or of the at least one cover, a deflection of the first shaft in relation to the second shaft is prevented so that a directed telescoping of the longitudinal shaft arrangement is enabled. In this case, the wall thicknesses of the first shaft and of the second shaft and also the stops are accurately adapted to the respective components of the longitudinal shaft arrangement so that in a predetermined manner the present crash energy is reduced particularly in steps as a result of variable deformation forces of the longitudinal shaft arrangement. In this way, on the one hand high deformation forces during the crash, which can lead to a deflection of components of the longitudinal shaft arrangement into the passenger compartment, are avoided while an adequate guiding length inside the longitudinal shaft arrangement is not yet provided. On the other hand, a highest degree of deformation energy is consumed because the longitudinal shaft arrangement permits maximum possible deformation forces in predetermined path sections.

According to an advantageous development, at least one center bearing is provided for supporting the longitudinal shaft arrangement in relation to a body. The center bearing is mounted on the first end of the journal on the first shaft, wherein with the further telescoping of first shaft and second shaft and while the joint inner part, which is arranged on the second end, is located in the section of the second shaft, the cage comes to butt against the center bearing or the joint outer part comes to butt against the second stop of the first shaft.

In the case of the longitudinal shaft arrangement which is disclosed herein, only the joint inner part penetrates into the tubular section of the second shaft so that the second shaft can be constructed with a small second inside diameter (and a correspondingly small outside diameter).

Further included in this disclosure is a motor vehicle having a longitudinal shaft arrangement as disclosed herein.

Figure 2:
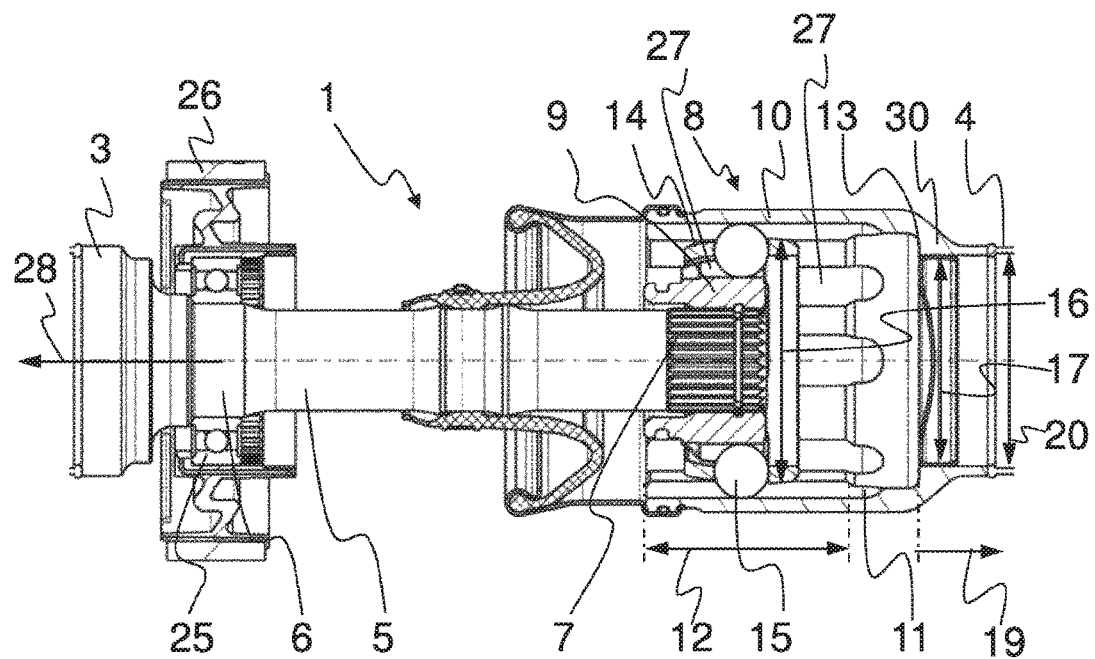
Figure 3:
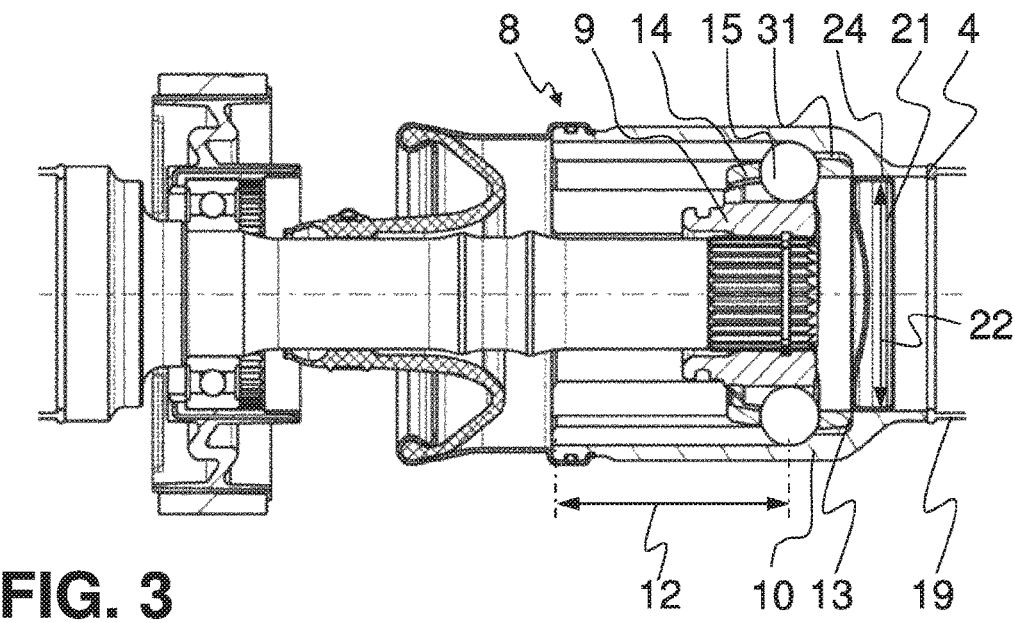
Figure 4:
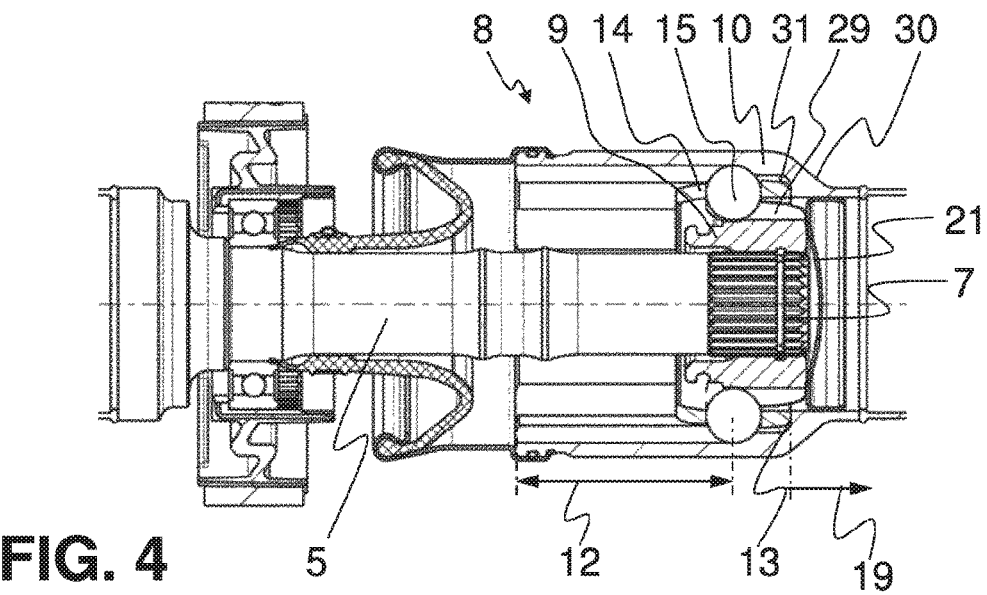
Figure 5:
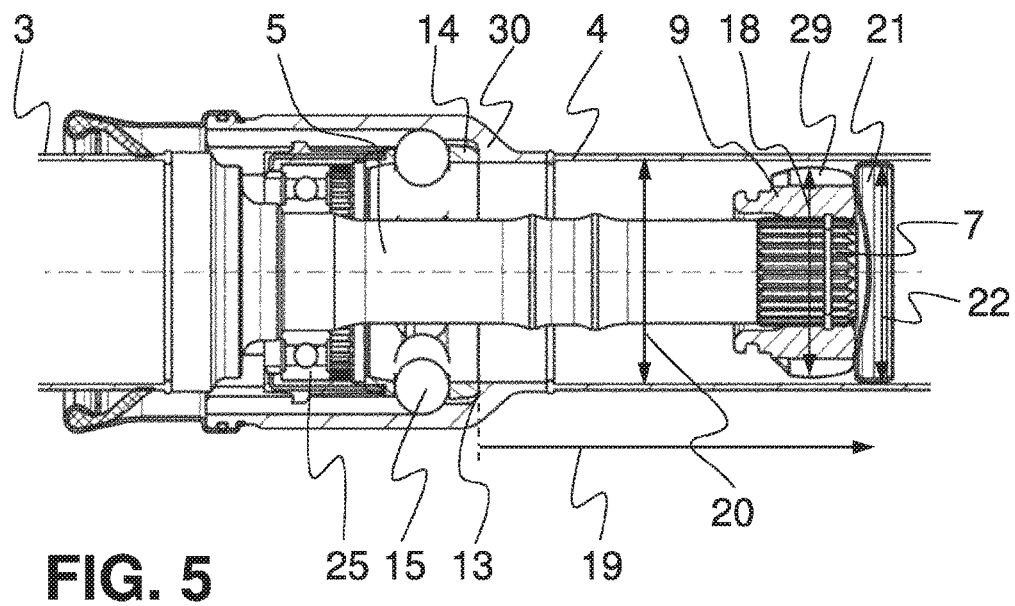

Further explanation is provided in more detail below with reference to the figures, which should be understood as examples, and not as limiting. The same designations are also used in the figures for the same items. Schematically, in the drawings:

FIG. 1: shows an example of a longitudinal shaft arrangement;

FIG. 2: shows the longitudinal shaft arrangement, wherein the ball-type constant velocity plunging joint is shown in an operating position;

FIG. 3: shows the longitudinal shaft arrangement, wherein the ball-type constant velocity plunging joint is shown in an end position;

FIG. 4: shows the longitudinal shaft arrangement, wherein the ball-type constant velocity plunging joint is shown in a position in which the cage is burst open; and FIG. 5: shows the longitudinal shaft arrangement, wherein the joint inner part is shown pushed into the second shaft.

FIG. 1 shows an example of a longitudinal shaft arrangement 1 of a motor vehicle 2. The arrangement of the longitudinal shaft arrangement 1 in the motor vehicle 2 is effected parallel to the direction of travel of the motor vehicle 2, that is to say parallel to the axial direction 28. The longitudinal shaft arrangement 1 consists at least of a first shaft 3 and a second shaft 4 which are interconnected via the ball-type constant velocity plunging joint 8 which is shown in the middle. The first shaft 3 in this case itself consists of a plurality of components, as indicated in FIG. 1. An additional ball-type constant velocity joint is especially arranged on the first shaft 3 on a journal of said first shaft 3, shown here on the left in FIG. 1. Provision is made on the other end of the first shaft 3 for a journal 5 which extends into the ball-type constant velocity plunging joint 8 of the longitudinal shaft arrangement 1. This journal 5 is connected by its second end 7 to the joint inner part 9 of the ball-type constant velocity plunging joint 8. The first end 6 extends toward a hollow section of the first shaft 3. A center bearing 25 in the form of a rolling bearing is arranged on the first end 6. The center bearing 25 is connected by its inner race to the first end 6 of the journal 5 and by its outer race to the body 26 of the vehicle. The center bearing 25 connects the longitudinal shaft arrangement 1 to the body 26 of the motor vehicle 2 and serves for vibration damping of the longitudinal shaft arrangement 1.

The second shaft 4 is connected to the joint outer part 10 of the ball-type constant velocity plunging joint 8. The second shaft 4, starting from the ball-type constant velocity joint 8, continues as a hollow shaft. Shown in the second shaft 4 in this case is a cover 21 which seals the ball-type constant velocity plunging joint 8 in relation to the second shaft 4. One, two, three or four additional covers 23 can be arranged in the second shaft so that by displacement or piercing of these additional covers 23 additional crash energy can be successively reduced.

FIG. 2 shows a detail of the longitudinal shaft arrangement 1, wherein the ball-type constant velocity plunging joint 8 is shown in an operating position. In the ball-type constant velocity plunging joint 8, the joint inner part 9 can be moved in relation to the joint outer part 10 along the axial direction 28 within a predetermined displacement range 12. Torque is transmitted via balls 15 from joint outer part 10 to joint inner part 9 (or vice versa), wherein a cage 14 is provided for guiding the balls 15 inside the ball-type constant velocity plunging joint 8. In FIG. 2, balls 15 are located in ball tracks 27 in a middle zone of the displacement range 12 of the ball-type constant velocity plunging joint 8. Only the displacement range 12 of the balls 15 in the joint outer part 10 is shown here.

The joint inner part 9 can additionally be displaced along the axial direction 28 in relation to the joint outer part 10.

In an end zone 11 of the displacement range 12 in the proximity of the joint bottom 30 of the joint outer part 10 provision is made for a first stop 13 which has a smallest first inside diameter 17. This is smaller than the largest first outside diameter 16 of the cage 14. As a result, the cage 14, after displacement of the joint inner part 9 in relation to the joint outer part 10, butts against this first stop 13 so that the displacement range 12 of the first shaft 3 in relation to the second shaft 4 in the axial direction 28 is limited. A further displacement of the first shaft 3 is not possible without deformation/damage/destruction of components since the joint inner part 9 has a largest second outside diameter 18 which is larger than the inside diameter of the cage 14 so that an undercut, that is to say a form-fitting connection in the axial direction 28, is formed. The second shaft 4, in a section 19 which, starting from the joint outer part 10, extends along the axial direction 28, has a smallest second inside diameter 20. This smallest second inside diameter 20 is especially smaller than the largest first outside diameter 16 of the cage 14.

FIG. 3 shows the longitudinal shaft arrangement 1, wherein the ball-type constant velocity plunging joint 8 is shown in an end position, i.e., the displacement range 12 of the joint outer part 10 is fully utilized and the cage 14 butts against the first stop 13 of the joint outer part 10. The balls 15 are located in an end zone 11 of the displacement range 12 of the joint outer part. Radially outside the cage 14, an encompassing free space 31 is provided in the joint outer part 10. It can be seen that the joint inner part 9 can be displaced still further in relation to the joint outer part 10 in the axial direction 28. Arranged in the second shaft 4 in the region of the joint bottom 30 is a cover 21 which seals the ball-type constant velocity plunging joint 8 in relation to the second shaft 4. The cover 21 has a largest third outside diameter 22 which forms a press fit with the smallest second inside diameter 20 of the section 19.

Going from a smallest value to a largest value the diameters 16, 17, 18, 20 and 22 can be selected in the following sequence:
1. Smallest second inside diameter 20 of the section 19;
2. Largest third outside diameter 22 of the cover 21 (forms a press fit with the smallest second inside diameter 20);
3. Largest second outside diameter 18 of the joint inner part 9 (forms a press fit with the smallest second inside diameter 20);
4. Smallest first inside diameter 17 of the first stop 13 (but can also correspond to the value of the smallest second inside diameter 20);
5. Largest first outside diameter 16 of the cage 14 (is larger than the smallest first inside diameter 17).

FIG. 4 shows the longitudinal shaft arrangement 1, wherein the ball-type constant velocity plunging joint 8 is shown in a position in which the cage 14 is burst open/expanded on account of the penetration of the joint inner part 9. Compared with the position of the joint inner part 9 and of the first shaft 3 in FIG. 3 it is evident here that the first shaft 3 is now displaced further in the axial direction 28 in relation to the second shaft 4. The cage 14 butts against the first stop 13 on the joint outer part 10. If in the event of a crash the first shaft 3 with the joint inner part 9 is now displaced still further in the axial direction 28 in relation to the second shaft 4, then the cage 14, or the undercut which is formed between cage 14 and joint inner part 9, is burst open and in particular the cage 14 is destroyed, or the cage 14 is expanded, which as a result enables the cage to be able to divert radially into the free space 31. A clearance fit is provided between the cover 21 and the section 19, as a result of which a telescoping, which is as force-free as possible, is to be enabled. The balls 15 leave the ball tracks 29 on the joint inner part 9 and the joint inner part 9 advances further into the second shaft 4.

FIG. 5 shows the longitudinal shaft arrangement 1, wherein the joint inner part 9 is shown pushed into the second shaft 4. The cage 14 continues to butt against the first stop 13. The first shaft 3 with the journal has penetrated into the section 19 of the second shaft 4. The second end 7 of the journal 5 and/or the joint inner part 9 has displaced the cover 21 as well into the section 19. Cover 21 and section 19 together with the largest third outside diameter 22 and the smallest second inside diameter 20 form a press fit so that during the displacement of the cover 21 along and inside the second shaft 4 crash energy is reduced by means of deformation energy. Cover 21 and/or joint inner part 9 ensure that the first shaft 3 is guided in the second shaft 4 so that a deflection of individual components of the longitudinal shaft arrangement 1 is avoided.

A plurality of covers 21 are especially provided in the second shaft 4 so that with piercing and/or displacement of the covers 21 crash energy can be further reduced.

The invention claimed is:

1. A longitudinal shaft system for a motor vehicle, comprising:
    a first shaft and a second shaft, wherein the first shaft has a journal with a first end and a second end, and a ball-type constant velocity plunging joint for connecting the first shaft to the second shaft,
    wherein a joint inner part of the ball-type constant velocity plunging joint is mounted on the second end and a joint outer part is arranged on the second shaft,
    wherein the joint outer part, in an end zone of a displacement range, has a first stop for a cage of the ball-type constant velocity plunging joint so that during telescoping of the first shaft and the second shaft the cage is brought to butt against the first stop,
    wherein with a further telescoping of first shaft and second shaft the cage and balls of the ball-type constant velocity plunging joint are restrained and the joint inner part, which is mounted on the second end, is moved together with the first shaft into the second shaft, and
    wherein a largest first outside diameter of the cage is larger than a smallest first inside diameter of the first stop, and a largest second outside diameter of the joint inner part is smaller than the smallest first inside diameter of the first stop.

2. The longitudinal shaft system of claim 1, wherein the second shaft in connection with the joint outer part is of tubular construction at least in one section and has a smallest second inside diameter which substantially corresponds to a largest second outside diameter of the joint inner part.

3. The longitudinal shaft system of claim 2, wherein the largest second outside diameter of the joint inner part:
    (a) corresponds to the smallest second inside diameter, or
    (b) is of smaller construction.

4. The longitudinal shaft system of claim 2, further comprising a cover that closes off the section of tubular construction of the second shaft toward the ball-type constant velocity plunging joint, wherein the cover has a largest third outside diameter which substantially corresponds to the smallest second inside diameter of the section.

5. The longitudinal shaft system of claim 4, wherein at least one additional cover is provided in the section.

6. The longitudinal shaft system of claim 5, wherein one of the cover and the at least one additional cover forms a press fit with the section.

7. The longitudinal shaft system of claim 2, further comprising at least one center bearing for supporting the longitudinal shaft arrangement in relation to a body, which at least one center bearing is mounted on the first end of the journal on the first shaft, wherein, with further telescoping of first shaft and second shaft, and while the joint inner part which is arranged on the second end is located in the section, the cage comes to butt against the center bearing.

8. The longitudinal shaft system of claim 2, wherein, in the end zone of the displacement range, provision is made for an encompassing free space in the joint outer part radially outside the cage, so that the cage, when it butts against the first stop and the joint inner part is further displaced in relation to the cage in an axial direction, is at least partially expanded.

9. The longitudinal shaft system of claim 1, wherein the first stop is positioned so that during telescoping of the first shaft and the second shaft an axial end of the cage is brought to butt against the first stop.

10. A longitudinal shaft system for a motor vehicle, comprising:
- a first shaft and a second shaft, wherein the first shaft has a journal with a first end and a second end, and a ball-type constant velocity plunging joint for connecting the first shaft to the second shaft,
- wherein a joint inner part of the ball-type constant velocity plunging joint is mounted on the second end and a joint outer part is arranged on the second shaft,
- wherein the joint outer part, in an end zone of a displacement range, has a first stop for a cage of the ball-type constant velocity plunging joint so that during telescoping of the first shaft and the second shaft the cage is brought to butt against the first stop,
- wherein with a further telescoping of first shaft and second shaft the cage and balls of the ball-type constant velocity plunging joint are restrained and the joint inner part, which is mounted on the second end, is moved together with the first shaft into the second shaft, and
- wherein the second shaft in connection with the joint outer part is of tubular construction at least in one section and has a smallest second inside diameter which substantially corresponds to a largest second outside diameter of the joint inner part, and
- a cover that closes off the section of tubular construction of the second shaft toward the ball-type constant velocity plunging joint, wherein the cover has a largest third outside diameter which substantially corresponds to the smallest second inside diameter of the section.

11. The longitudinal shaft system of claim 10, wherein at least one additional cover is provided in the section.

12. The longitudinal shaft system of claim 11, wherein one of the cover and the at least one additional cover forms a press fit with the section.

13. A longitudinal shaft system for a motor vehicle, comprising:
- a first shaft and a second shaft, wherein the first shaft has a journal with a first end and a second end, and a ball-type constant velocity plunging joint for connecting the first shaft to the second shaft,
- wherein a joint inner part of the ball-type constant velocity plunging joint is mounted on the second end and a joint outer part is arranged on the second shaft,
- wherein the joint outer part, in an end zone of a displacement range, has a first stop for a cage of the ball-type constant velocity plunging joint so that during telescoping of the first shaft and the second shaft the cage is brought to butt against the first stop,
- wherein with a further telescoping of first shaft and second shaft the cage and balls of the ball-type constant velocity plunging joint are restrained and the joint inner part, which is mounted on the second end, is moved together with the first shaft into the second shaft, and
- wherein the second shaft in connection with the joint outer part is of tubular construction at least in one section and has a smallest second inside diameter which substantially corresponds to a largest second outside diameter of the joint inner part, and
- at least one center bearing for supporting the longitudinal shaft arrangement in relation to a body, which at least one center bearing is mounted on the first end of the journal on the first shaft, wherein, with further telescoping of first shaft and second shaft, and while the joint inner part which is arranged on the second end is located in the section, the cage comes to butt against the center bearing.

* * * * *